US010742960B1

(12) United States Patent
Gupta et al.

(10) Patent No.: US 10,742,960 B1
(45) Date of Patent: Aug. 11, 2020

(54) PANORAMIC 3D CAMERA (71) Applicant: Altia Systems Inc, Cupertino, CA (US)

(72) Inventors: Yashket Gupta, Santa Clara, CA (US); Naveed Alam, Cupertino, CA (US); Aurangzeb Khan, Portola Valley, CA (US); Ted Vucurevich, Cupertino, CA (US)

(73) Assignee: Altia Systems, Inc., Cupertino, CA (US)

( * ) Notice: Subject to any disclaimer, the term of this patent is extended or adjusted under 35 U.S.C. 154(b) by 27 days.

(21) Appl. No.: 15/636,556

(22) Filed: Jun. 28, 2017

Related U.S. Application Data (60) Provisional application No. 62/355,837, filed on Jun. 28, 2016.

(51) Int. Cl.
*H04N 13/00* (2018.01)
*H04N 13/243* (2018.01)
*G06T 3/40* (2006.01)
*H04N 5/232* (2006.01)

(52) U.S. Cl.
CPC ......... *H04N 13/243* (2018.05); *G06T 3/4038* (2013.01); *H04N 5/23238* (2013.01)

(58) Field of Classification Search
CPC . H04N 13/243; H04N 5/23238; G06T 3/4038
See application file for complete search history.

(56) References Cited

U.S. PATENT DOCUMENTS

| 9,497,380 | B1 * | 11/2016 | Jannard | H04N 5/23238 |
| 2004/0057633 | A1 * | 3/2004 | Mai | G06T 3/4038 |
| | | | | 382/284 |
| 2010/0194851 | A1 * | 8/2010 | Pasupaleti | G06T 3/4038 |
| | | | | 348/36 |
| 2016/0142643 | A1 * | 5/2016 | Jiang | G06T 5/006 |
| | | | | 348/598 |
| 2017/0289448 | A1 * | 10/2017 | Song | H04N 5/2252 |
| 2018/0241915 | A1 * | 8/2018 | Guan | H04N 5/225 |

OTHER PUBLICATIONS

Gurrieri et al. "Stereoscopic cameras for the real-time acquisition of panoramic 3D images and videos". (Year: 2013).*
Jiang et al. "Video Stitching with Spatial-Temporal Content-Preserving Warping". (Year: 2015).*

* cited by examiner

*Primary Examiner* — Zhihan Zhou
(74) *Attorney, Agent, or Firm* — HM Law Group LLP; Vanintheran Moodley (57) ABSTRACT

A three dimensional imaging system for generating a 3D panoramic video/image is disclosed. The three dimensional imaging system comprising a plurality of stereoscopic pairs of compound cameras is disclosed. The pair of compound cameras being separated by a predefined distance d.

8 Claims, 6 Drawing Sheets

PANORAMIC 3D CAMERA

FIELD

The present disclosure relates to the field of imaging systems and more particularly to three-dimensional (3D) imaging systems. The 3D imaging system utilizes a plurality of compound imagers including a plurality of camera sensors to capture image data covering a 360° field of view in order to create a panoramic 3D image and/or video.

BACKGROUND

The conventional 3D cameras include two stereoscopic cameras which capture a scene, each from a slightly different vantage point. The camera configuration is typically similar to that of human eyes; with two cameras kept at a distance to capture two different views with an overlapping view. However, the conventional 3D cameras have field-of-view (FOV) of approximately 85°, which is less than the FOV of a human eye. Also, such stereoscopic cameras do not help in achieving an expanded or panoramic field of view.

Typical 3D video cameras, produce a synchronized video from a pair of cameras (one right and one left) kept at a distance from each other. Such camera system is also similar to that of human eyes. The video captured from the right camera must be viewed by the right eye and the video captured from the left camera must be viewed by the left eye in order to create the 3D effect.

Panoramic videos with ultra wide-angle field of view may be captured using fisheye lenses. However, such lenses can lead to significant radial and scale distortions. Another approach to creating panoramic video is to use cameras with regular field-of-view (FOV) aligned to capture different overlapping images of a scene at a same time. The different scenes are then aligned and stitched to form a panoramic image or video.

For generating a panoramic 3D video, multiple 3D camera pairs are used to capture 3D image streams of a scene which are stitched together to create a panoramic 3D video. However, this causes parallax error which increases significantly with increase in distance between the 3D stereoscopic cameras pairs. Further, the requirement of iterative processing measurably degrades the image quality. Therefore, a panoramic 3D camera is required which can produce a high quality panoramic 3D images and/or videos.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

The embodiments of the present invention disclose techniques and systems for generating panoramic 3D video which is free from the effects of parallax. In an embodiment, first and second panoramic image streams correspond to images for the left eye and right eye, respectively. Each of the first and the second image streams are generated using a stereoscopic pair of compound/composite imaging system which further comprises multiple cameras. The panoramic image streams are created by stitching the image streams generated using stitching techniques as described in co-pending U.S. patent application Ser. No. 13/902,248, file on May 24, 2013 and entitled "STITCHING FOR A MULTIPLE IMAGE OR VIDEO SYSTEM BASED ON A NON-LINEAR SEAM", which is hereby incorporated by reference. The present embodiment advantageously describes the stitching techniques which are applied to non 3D images in order to reduce parallax errors.

In an embodiment, a three dimensional imaging system may comprise multiple stereoscopic pairs of compound/composite cameras. In each pair of stereoscopic compound/composite camera the compound/composite cameras may be separated by a distance 'd'. The distance 'd' may be equal to inter-ocular distance between a pair of human eyes.

The compound/composite camera may include an array of camera sensors. The array of camera sensors may be arranged along a convex axis. The camera sensors may be arranged on the convex axis such that the field of view of each camera sensor overlaps with at least of the adjoining camera sensor.

In an embodiment, there may be three camera sensors in an array of camera sensors.

In an embodiment, the three dimensional imaging system may operate in a first mode to generate panoramic images of a scene. The panoramic images may be generated by stitching the images captured by the array of camera sensors simultaneously. The images captured simultaneously by the adjoining camera sensors may include an overlapping area. The overlapping area may be used to stitch the images to get a panoramic image with a wider field of view.

In an embodiment, the three dimensional imaging system may operate in a second mode in which 3D panoramic images may be generated by stitching the panoramic images captured by each stereoscopic pair of compound cameras.

In an embodiment, the three dimensional imaging system may operate in a third mode in which a 3D panoramic image with 360° field of view may be generated by stitching the 3D panoramic images captured by each of the stereoscopic pair of compound cameras.

In an embodiment, multiple stereoscopic pairs of compound cameras may be arranged on a housing in various geometries so as to cover a 360° field of view of a scene.

In an embodiment, three stereoscopic pair of compound cameras may be arranges in a triangular arrangement. Each stereoscopic pair of compound cameras may be arranged at one side of the triangle so as to cover one third of the 360° field of view.

In an embodiment, the stereoscopic pair of compound cameras may be arranged in a rectangular or octagonal arrangement so as to cover a 360° field of view.

Other aspects and example embodiments are provided in the drawings and the detailed description that follows.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

The teachings and principles of the present invention are applicable to a wide variety of imaging systems and sensors, relying on a number of equipment and platform configurations. For purposes of explanation and illustration, however, the present invention is hereafter described in reference to one particular embodiment of a system for generating panoramic 3D video. It should be understood, however, that those of skill in the art will, upon reference to this description, be able to apply the principles and teachings of the present invention in a wide variety of imaging systems— from personal digital cameras to satellites and other spacecraft-based surveillance systems.

Figure 1:
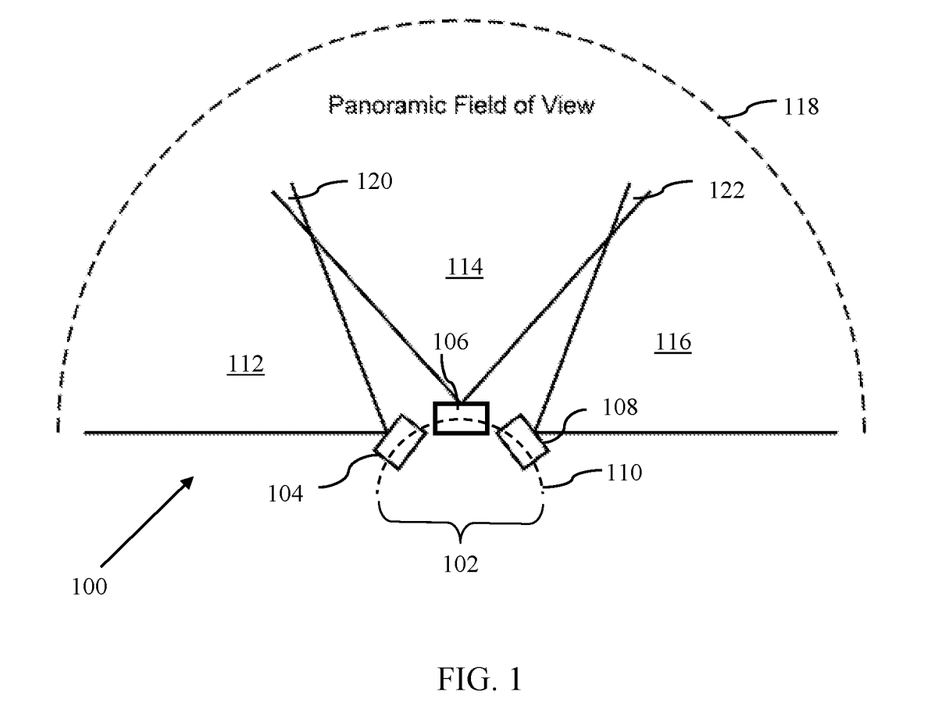
FIG. 1 illustrates a compound/composite camera 100, in accordance with one embodiment of the invention.

Referring to FIG. 1, a compound/composite camera 100 is illustrated in accordance with one embodiment of the invention. FIG. 1 depicts a compound camera 100 which may comprise a camera array assembly 102. The assembly 102 comprises three cameras sensors 104, 106 and 108 which may be mounted on housing not illustrated in the figure. The camera sensors 104, 106 and 108 are disposed along a convex axis 110. The camera sensors 104, 106 and 108 may be disposed such that the focal axis of all the sensors diverges with respect to the axis 110. The radius of curvature of the axis 110 may vary or may be altered accordingly, to provide the ability to decrease or increase the field-of-view of the compound camera 100. The assembly 102 is configured such that the field-of-view of each camera sensor overlaps with the FOV of the adjacent camera sensors. The camera sensors 104, 106 and 108 may be preferably separated from each other, along the convex axis 110, at equal angular intervals. The exact angle of displacement between the sensors may vary depending upon the number of sensors utilized. The field-of-view for each of the camera sensors 104, 106 and 108 are indicated by 112, 114 and 116 respectively. In order to generate panoramic image/video, the field-of-views of the camera sensors 104 and 106 may include an overlapping FOV 120 and camera sensors 106 and 108 may include overlapping FOV 122.

To generate a panoramic image of a scene, camera sensors 104, 106 and 108 may simultaneously capture images of the scene at same instant. The images captured by each of the camera sensors 104, 106 and 108 includes an overlapping region which may be stitched together to form a panoramic image covering a field-of-view indicated by reference numeral 118. In one embodiment, the field-of-view 118 may approximate the field-of-view of a human eye. The panoramic images are generated by stitching the images captured by the sensors 104, 106 and 108 using stitching techniques described in co-pending U.S. patent application Ser. No. 13/902,248, filed on May 24, 2013 and titled "STITCHING FOR A MULTIPLE IMAGE OR VIDEO SYSTEM BASED ON A NON-LINEAR SEAM", and U.S. patent application Ser. No. 13/902,186, filed on May 24, 2013 and titled "Dynamic Stitching for a Multiple Imager Video System" which are hereby incorporated by reference.

In an embodiment, the camera sensors 104, 106 and 108 may be rotated about a vertical axis passing perpendicular to the axis 110 as shown in FIG. 1. Rotation of the camera sensors 104, 106 and 108 around the vertical axis may allow for the adjustment of the overlapping field of view and in turn may allow the adjustment of the field of view of the composite camera 100.

Figure 2:
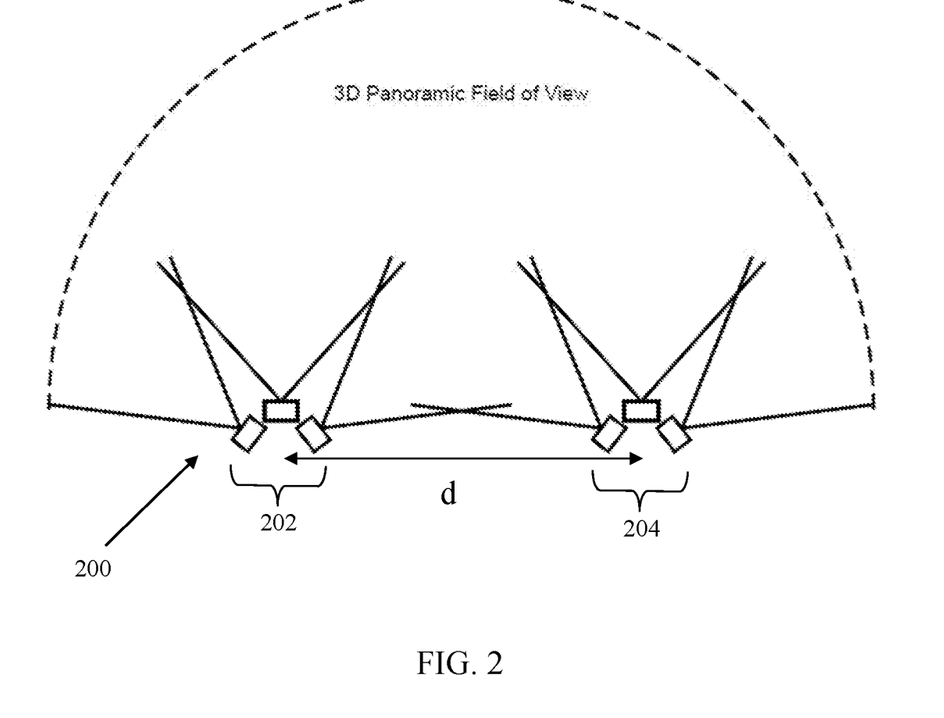
FIG. 2 illustrates a stereoscopic pair of compound/composite camera 200 for generation of a panoramic 3D image/video, in accordance with one embodiment of the invention.

Referring to FIG. 2, a 3D imaging system 200 is illustrated which includes two compound cameras 202 and 204 as described with reference to FIG. 1. In order to generate 3D panoramic video/images, a imaging system 200 may include a stereoscopic pair of compound/composite cameras 202 and 204 which may be separated by a distance 'd'. The distance 'd' approximates the inter-ocular distance between a pair of human eyes. The average inter-ocular distance for an adult human being is 65 mm.

Referring to FIG. 2, it may be seen that each compound camera, generates a panoramic images with 180° field-of-view. The compound camera 202 on the left generates the panoramic images for the left eye, whereas the compound camera 204 on the right generates panoramic images for the right eye, in accordance with the embodiment described with reference to FIG. 1. Thus, two panoramic images are created.

In an embodiment, the stereoscopic imaging system 200 operates in a first mode which may be defined as "panoramic image generation" mode. In such a mode, the compound cameras 202 and 204 are configured to capture a scene simultaneously to generate a panoramic image by each of the compound cameras 202 and 204. Referring to the FIG. 2, the compound camera 202 may capture a panoramic image which corresponds to a left eye image of stereoscopic imaging system 200. The compound camera 204 may capture a panoramic image which corresponds to a right eye image of stereoscopic imaging system 200.

In an embodiment, the left eye panoramic image and the right eye panoramic image may have a FOV of 180° each. The two panoramic images may include an overlapping FOV.

In an embodiment, the stereoscopic imaging system 200 operates in a second mode which may be defined as "panoramic 3D image generation" mode. In such a mode, the two panoramic images including the overlapping FOV are stitched in order to capture a scene in a panoramic 3D image/video.

In an embodiment, a means to adjust the inter-ocular distance between the two cameras may be provided for adjusting the inter-ocular distance between the two stereoscopic pair of composite cameras. The inter-ocular distance may be adjusted using various methods known in the art.

Figure 3:
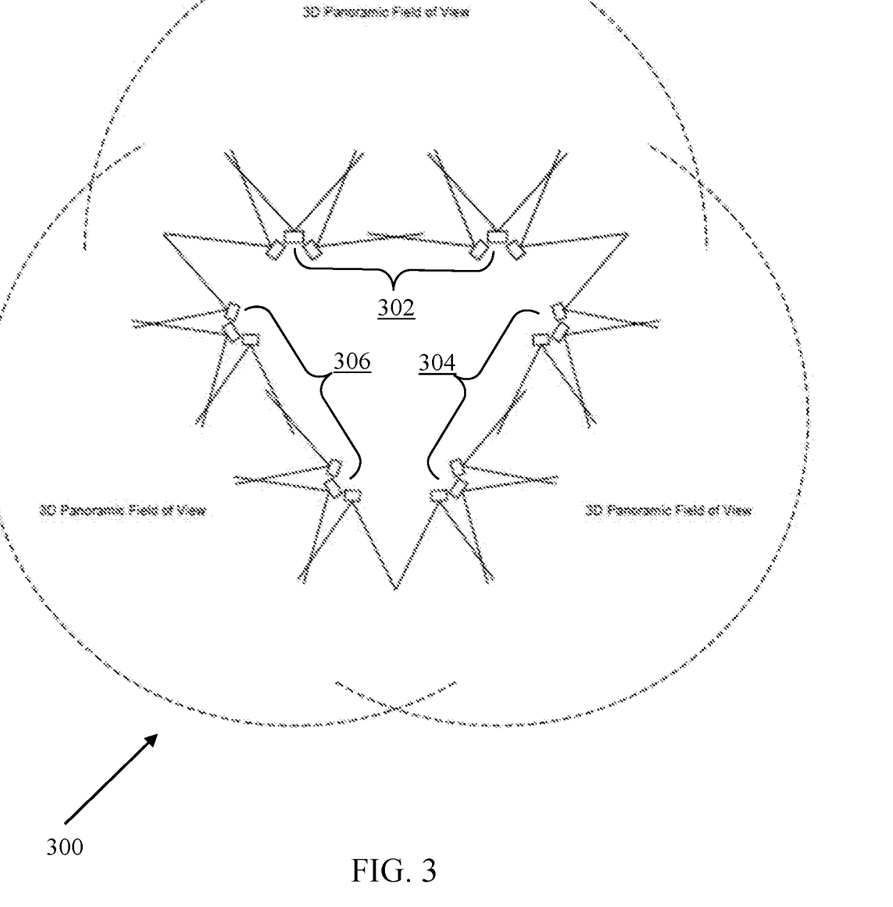
FIG. 3 illustrates a triangular arrangement of stereoscopic pairs of compound/composite cameras 300 for generation of a panoramic 3D image/video, in accordance with one embodiment of the invention.

Referring to FIG. 3, a stereoscopic imaging system 300 in a triangular arrangement of three stereoscopic pairs of compound/composite cameras 302, 304 and 306 is illustrated. A panoramic 3D image/video may be generated as illustrated in FIG. 1 and FIG. 2. Each of the three pair of stereoscopic compound cameras 302, 304 and 306 may capture one third of the field of view of the 360° field of view. The stereoscopic pair of compound cameras 302 may have an overlapping field of view with the adjoining stereoscopic pair of compound cameras 304 and 306. Similarly, each pair of stereoscopic compound cameras may have an overlapping field of view with the field of view of the adjoining pair of stereoscopic compound cameras.

In an embodiment, the stereoscopic imaging system 300 operates in a third mode, which may be defined as "360° panoramic 3D image generation" mode. In such a mode, a panoramic 3D image covering a 360° field of view is generated by stitching the three 3D panoramic images generated by each of stereoscopic pairs of compound cameras 302, 304 and 306. The panoramic images are generated by using stitching techniques described in co-pending U.S. patent application Ser. No. 13/902,248, filed on May 24, 2013 and titled "STITCHING FOR A MULTIPLE IMAGE OR VIDEO SYSTEM BASED ON A NON-LINEAR SEAM", and U.S. patent application Ser. No. 13/902,186, filed on May 24, 2013 and titled "Dynamic Stitching for a Multiple Imager Video System" which are hereby incorporated by reference.

Figure 4:
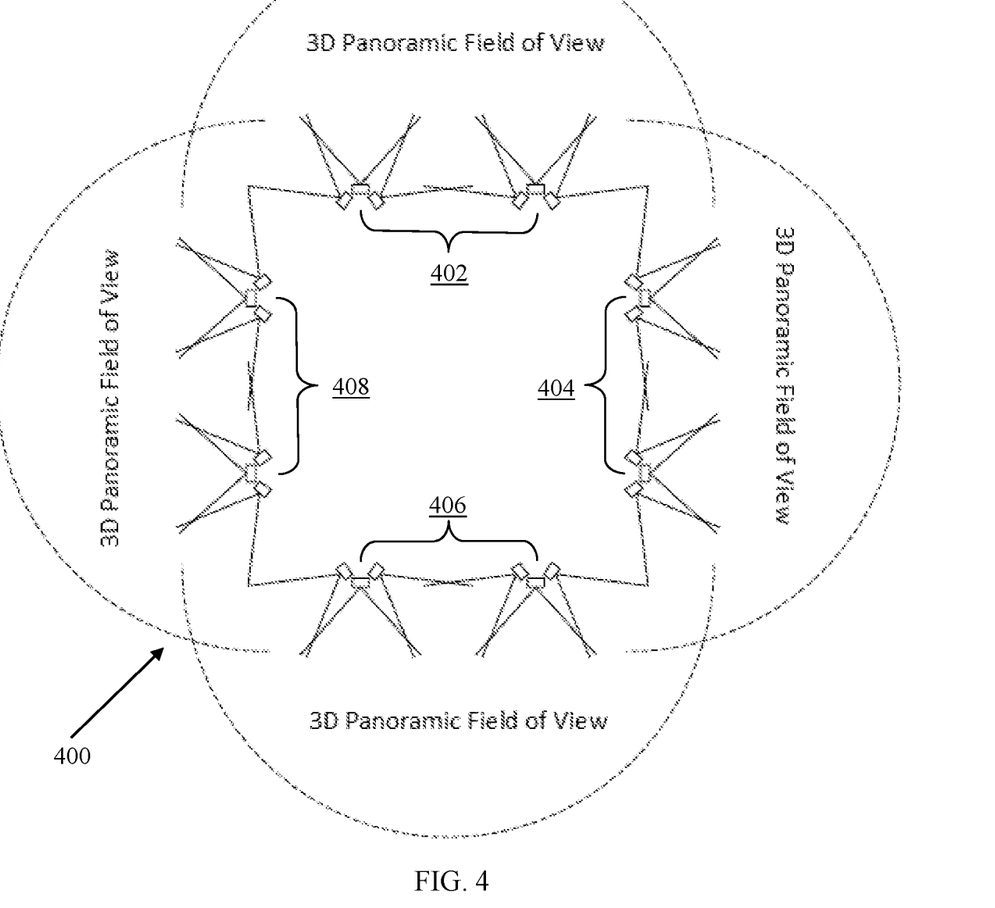
FIG. 4 illustrates a rectangular arrangement of stereoscopic pairs of compound/composite cameras 400 for generation of a panoramic 3D image/video, in accordance with one embodiment of the invention.

Referring to FIG. 4, a stereoscopic imaging system 400 in a rectangular arrangement of four stereoscopic pairs of compound/composite cameras 402, 404, 406 and 408 is illustrated. A panoramic 3D image/video may be generated as illustrated in FIG. 1 and FIG. 2. Each of the four pair of stereoscopic compound cameras 402, 404, 406 and 408 may capture one fourth of the field of view of the 360° field of view. The stereoscopic pair of compound cameras 402 may have an overlapping field of view with the adjoining stereoscopic pair of compound cameras 404 and 408. Similarly, each pair of stereoscopic compound cameras may have an overlapping field of view with the field of view of the adjoining stereoscopic pair of compound cameras.

In an embodiment, the stereoscopic imaging system 400 operates in a third mode, which may be defined as "360° panoramic 3D image generation" mode. In such a mode, a panoramic 3D image covering a 360° field of view is generated by stitching the four 3D panoramic images generated by each of stereoscopic pairs of compound cameras 402, 404, 406 and 408. The 3D panoramic images generated by each of the pair of stereoscopic compound cameras 402, 404, 406 and 408 including the overlapping FOVs are stitched in order to capture a scene in a 360° panoramic 3D image/video.

Figure 5:
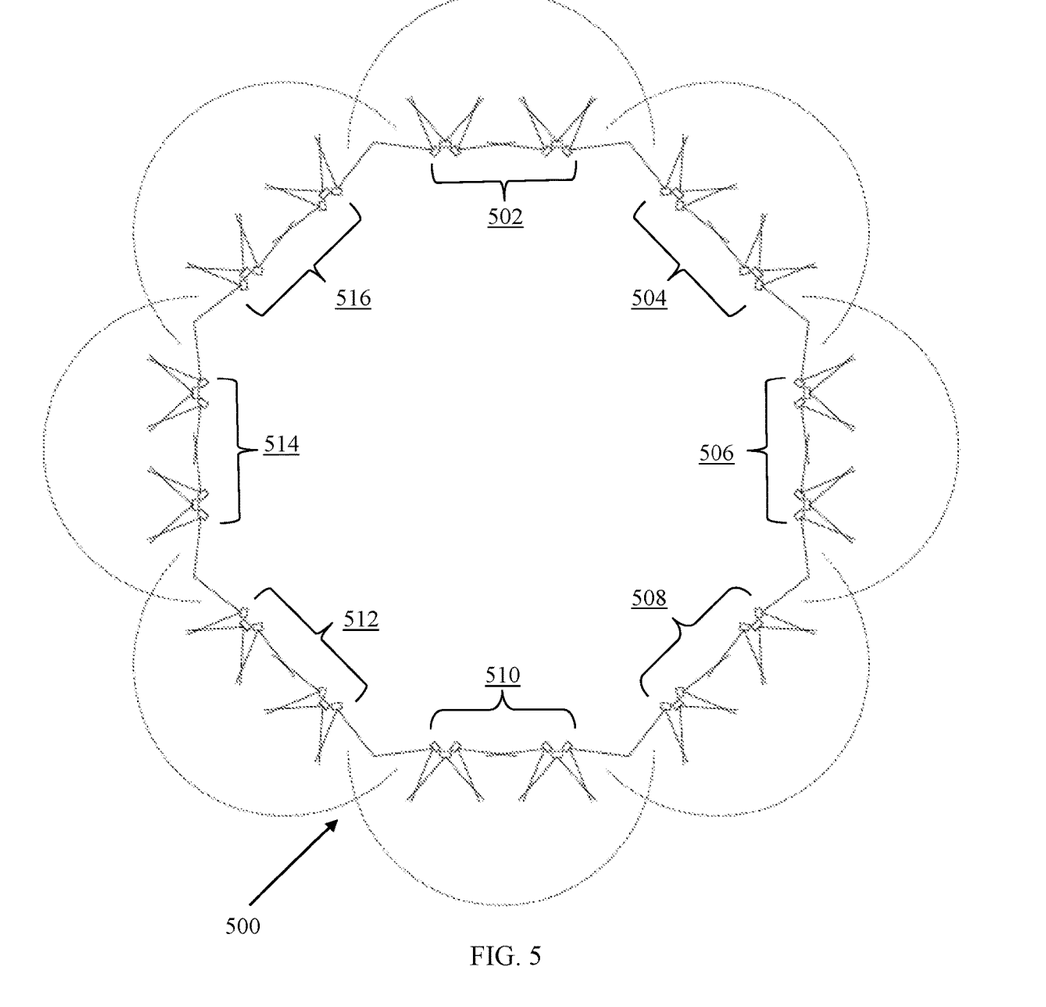
FIG. 5 illustrates a octagonal arrangement of stereoscopic pairs of compound/composite cameras 500 for generation of a panoramic 3D image/video, in accordance with one embodiment of the invention.

Referring to FIG. 5, a stereoscopic imaging system 500 in a octagonal arrangement of eight stereoscopic pairs of compound/composite cameras 502-518 is illustrated. A panoramic 3D image/video may be generated as illustrated in FIG. 1 and FIG. 2. Each of the eight pair of stereoscopic compound cameras 502-518 may capture a part of the 360° field of view. Each stereoscopic pair of compound cameras 502-518 may have an overlapping field of view with the field of view of the adjoining pair of stereoscopic compound cameras.

In an embodiment, the stereoscopic imaging system 500 operates in a third mode, which may be defined as "360° panoramic 3D image generation" mode. In such a mode, a panoramic 3D image covering a 360° field of view is generated by stitching the eight 3D panoramic images generated by each of stereoscopic pairs of compound cameras 502-518.

Figure 6:
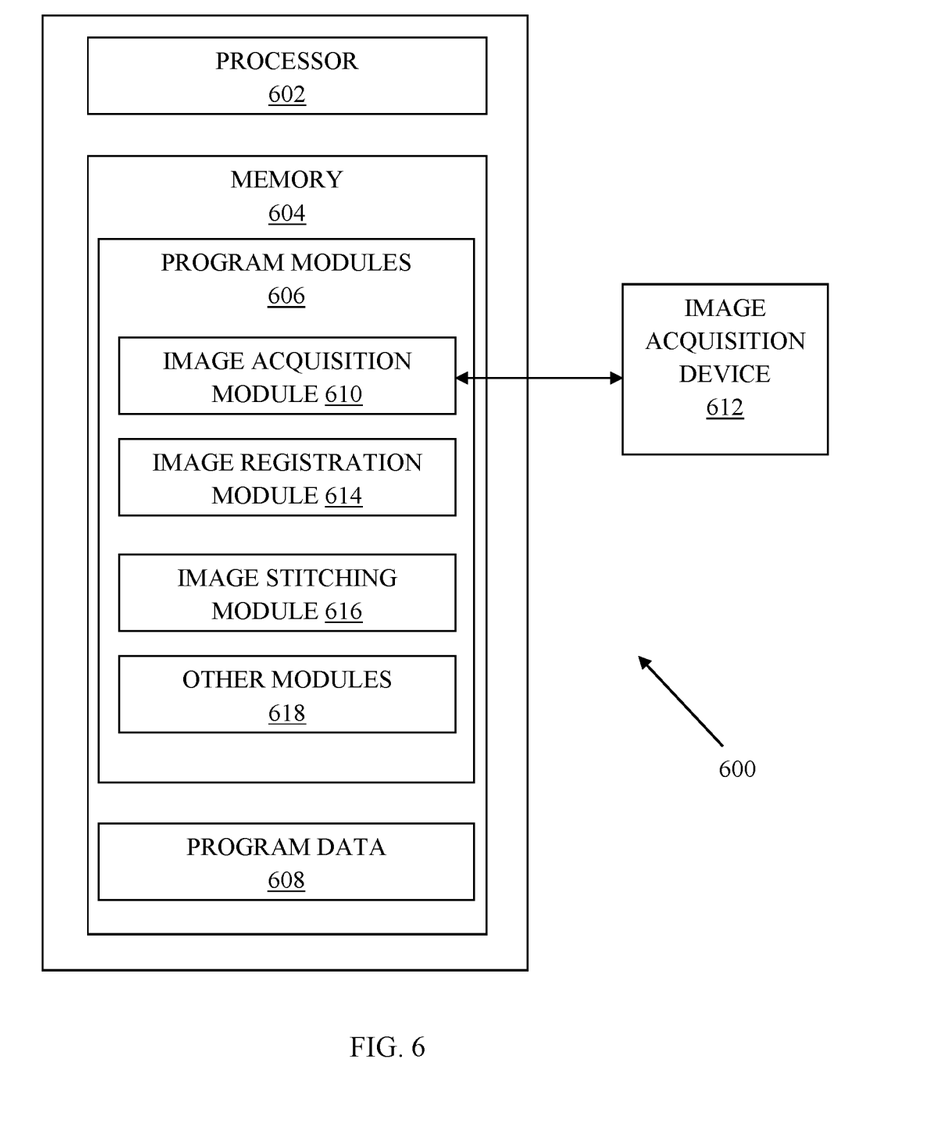
FIG. 6 illustrates a block diagram of a panoramic 3D imaging system, in accordance with one embodiment of the invention.

Referring to FIG. 6, a block diagram of a panoramic 3D imaging system 600 is illustrated. The panoramic 3D imaging system 600 includes a processor 602 coupled to a memory 604. The memory 604 includes program modules 606 and program data 608.

The program modules 606 may include one or more modules configure to perform one or more functions when executed by the processor 602. The functions could be, for example, one of the many steps involved in panoramic 3D image/video generation. For instance, the program modules 606 may include an image acquisition module 610, a functionally coupled to an image acquisition device 612 (or 604) configured to acquire a plurality of images or video frames corresponding to a scene. The image acquisition module 610 coordinates the capturing of the images with the image acquisition device 612. The program module 606 may further include image registration module 614 that further includes an image stitching module 616. The processor 602 executes one or more of the program modules 606 in conjunction with other modules 618 that includes operating system and other application software required for panoramic 3D image/video generation.

The memory 604 may include for example, preferably random access memory (RAM) or other dynamic memory may be used for storing information and instructions to be executed by processor. Main memory may also be used for storing temporary variables or other intermediate information during execution of instructions to be executed by processor. Computing module may likewise include a read only memory ("ROM") or other static storage device coupled to bus for storing static information and instructions for processor.

The program data 608 may be included in a database which may include, for example, a media drive and a storage unit interface. The media drive may include a drive or other mechanism to support fixed or removable storage media. For example, a hard disk drive, a floppy disk drive, a magnetic tape drive, an optical disk drive, a CD, DVD or Blu-ray drive (R or RW), or other removable or fixed media drive may be provided. Accordingly, storage media might include, for example, a hard disk, a floppy disk, magnetic tape, cartridge, optical disk, a CD, DVD or Blu-ray, or other fixed or removable medium that is read by, written to or accessed by media drive. As these examples illustrate, the storage media may include a computer usable storage medium having stored therein computer software or data.

The communications module may include various communications interfaces such as an Ethernet, network interface card, WiMedia, IEEE 802.XX or other interface), or other communications interface. Data transferred via communications interface may typically be carried on signals, which can be electronic, electromagnetic (which includes optical) or other signals capable of being exchanged by a given communications interface. These signals may be provided to communications interface via a channel. This channel may carry signals and may be implemented using a wired or wireless communication medium. Some examples of a channel may include a phone line, a cellular link, an RF link, an optical link, a network interface, a local or wide area network, and other wired or wireless communications channels.

As used herein, the term "module" may describe a given unit of functionality that may be performed in accordance with one or more embodiments of the present invention. As used herein, a module may be implemented utilizing any form of hardware, software, or a combination thereof. For example, one or more processors, controllers, ASICs, PLAs, PALs, CPLDs, FPGAs, logical components, software routines or other mechanisms may be implemented to make up a module. In implementation, the various modules described herein may be implemented as discrete modules or the functions and features described may be shared in part or in total among one or more modules. In other words, as would be apparent to one of ordinary skill in the art after reading this description, the various features and functionality described herein may be implemented in any given application and may be implemented in one or more separate or shared modules in various combinations and permutations. Even though various features or elements of functionality may be individually described or claimed as separate modules, one of ordinary skill in the art will understand that these features and functionality may be shared among one or more common software and hardware elements, and such description shall not require or imply that separate hardware or software components are used to implement such features or functionality. Where components or modules of the invention are implemented in whole or in part using software, in one embodiment, these software elements may be implemented to operate with a computing or processing module capable of carrying out the functionality described with respect thereto. After reading this description, it will become apparent to a person skilled in the relevant art how to implement the invention using other computing modules or architectures. Modules may be implemented using a general-purpose or special-purpose processing engine such as, for example, a microprocessor, controller, or other control logic. In the illustrated example, the modules could be connected to a bus, although any communication medium may be used to facilitate interaction with other components of computing modules or to communicate externally.

Numerous specific details may be set forth herein to provide a thorough understanding of a number of possible embodiments of a digital imaging system incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A three-dimensional imaging system comprising:
   a plurality of stereoscopic pairs of compound imagers each having an overlapping panoramic field of view, wherein
   each of the pair of compound imagers are separated by a predefined distance d, and wherein the imaging system is configured to:
   operate in a first mode to generate plurality of panoramic images simultaneously by each of the compound imagers;
   calculate a spatial distortion and a temporal distortion for each column in a region of overlap corresponding to the overlapping panoramic field of view of the panoramic images;
   mark the column for which the calculated spatial distortion and the temporal distortion is minimum as a seam location; and
   changing the location of seam based on detection of a face in the column for which the calculated spatial distortion and the temporal distortion is minimum.

2. The three-dimensional imaging system according to claim 1, wherein each compound imager comprises a camera array assembly.

3. The three-dimensional imaging system according to claim 2, wherein the camera array assembly comprise a plurality of camera sensors arranged along a convex axis.

4. The three-dimensional imaging system according to claim 3, wherein the plurality of cameras are arranged such that field of view of each of the plurality of cameras sensors overlap with field of view of at least one of the adjacent camera sensors.

5. The three-dimensional imaging system according to claim 1, wherein the panoramic images are generated by stitching images simultaneously captured by each of the compound imagers.

6. The three-dimensional imaging system according to claim 1, is further configured to operate in a second mode in which a 3D panoramic image is generated by stitching the panoramic images captured by each stereoscopic pair of compound imagers.

7. The three-dimensional imaging system according to claim 1, is further configured to operate in a third mode in which a 3D panoramic image with 360° field of view is generated by stitching the 3D panoramic images captured by each of the stereoscopic pair of compound imagers.

8. A method of generating three-dimensional (3D) image comprising:
   arranging a plurality of stereoscopic pairs of compound imagers each having an overlapping panoramic field of view, wherein the pair of compound imagers are separated by a predefined distance d;
   operating in a first mode to generate plurality of panoramic images simultaneously by each of the compound imagers;
   calculating a spatial distortion and a temporal distortion for each column in a region of overlap corresponding to the overlapping panoramic field of view of the panoramic images;
   marking the column for which the calculated spatial distortion and the temporal distortion is minimum as a seam location; and
   changing the location of seam based on detection of a face in the column for which the calculated spatial distortion and the temporal distortion is minimum.

* * * * *